Aug. 1, 1939.    F. C. BEST    2,167,868
MOTOR VEHICLE
Filed May 7, 1936
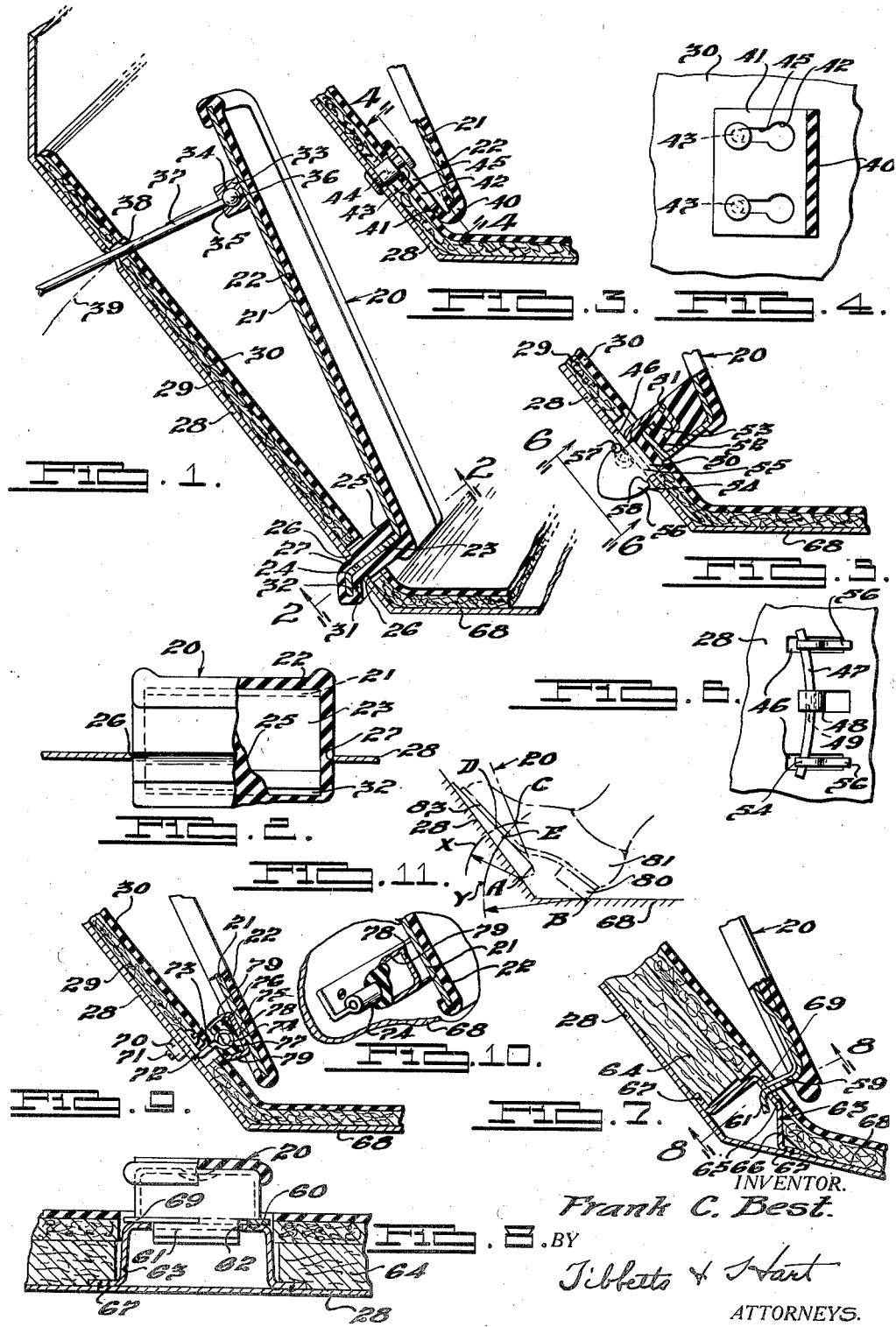
INVENTOR.
Frank C. Best.
BY
Tibbetts & Hart
ATTORNEYS.

Patented Aug. 1, 1939

2,167,868

UNITED STATES PATENT OFFICE 2,167,868

MOTOR VEHICLE

Frank C. Best, Detroit, Mich., assignor to Packard Motor Car Company, Detroit, Mich., a corporation of Michigan Application May 7, 1936, Serial No. 78,334

17 Claims. (Cl. 74—513)

The invention relates generally to improvements in pedals and includes the mounting thereof whereby improved operation is obtained.

One of the objects of the invention is to provide an integral and unitary pedal structure which can be pivotally supported in direct contact with the floor of a motor vehicle without the use of auxiliary or assembled parts.

Another object of the invention is to provide a unitary pedal structure having characteristics of a nature such that the adjustments usually made in accommodating the varying dimensions encountered in the manufacture and assemblage of separate parts are eliminated.

Another object of the invention is to provide a locked pivotal mounting for a pedal easily released by a single manual operation in tilting the pedal from its operative position in a direction naturally followed when removing it.

Another object of the invention is to provide an accelerator pedal structure operable with slight effort to prevent fatigue over long periods of time.

Another object of the invention is to provide an accelerator pedal mounted so that the foot of the driver may automatically serve as a wedge between the pedal and the floor in a manner steadying the operation of the accelerator mechanism under driving conditions.

These being among the objects of the present invention other and further objects will become apparent from the following description, the drawing relating thereto and the appended claims.

In the accompanying drawing:

Fig. 1 is a fragmentary cross-sectional view in perspective of the toe board and accelerator pedal of a motor vehicle constructed according to one form of the invention;

Fig. 2 is an enlarged partially sectional view taken on line 2—2 of Fig. 1;

Fig. 3 is a cross-sectional view of a pivotal mounting showing another form of the invention;

Fig. 4 is a partially sectional view taken on the line 4—4 of Fig. 3;

Fig. 5 is a cross-sectional view of a pedal mounting showing another form of the invention;

Fig. 6 is a sectional view taken on the line 6—6 of Fig. 5;

Fig. 7 is a cross-sectional view of a pedal mounting showing another form of the invention;

Fig. 8 is a sectional view taken on the line 8—8 of Fig. 7;

Fig. 9 is a cross-sectional view of a pedal mounting showing another form of the invention;

Fig. 10 is a partially cut away perspective view of the structure shown in Fig. 9 showing the structures and manner of assemblage;

Fig. 11 is a diagrammatical representation of a preferred embodiment of the invention.

In the preferred embodiment of the invention shown in Figs. 1 and 2, the improved pedal comprises an elongated central portion or treadle 20 having a core or stamping 21, preferably of metal, serving to support and reinforce a rubber coating 22 bonded thereto as by vulcanizing and providing a tread surface suitably faced to engage frictionally with the foot of a driver. At the lower end the stamping 21 is terminally bent downward to form a downwardly extending supporting flange 23 terminating in a tongue 24, both of which are entirely covered with a rubber sheath 25 of a thickness reduced over the tongue 24 in a manner providing downwardly facing shoulders 26. The tongue portion 24 is of an elongated cross-sectional configuration and is received in an opening 27 of a like configuration provided for that purpose in an automobile toe board 28 suitably covered with a pad 29 and carpet 30. Shoulders 26 contact the face of the toe board marginally around the opening 27 and determine the extent of the insertion of the tongue 24 in the opening in a manner providing a pivotal support for the treadle including a check against drafts coming through the opening and a snug pivotal engagement cushioned entirely in rubber so as to prevent rattles and squeaks. The tongue 24 and opening 27, engaging each other closely and being of corresponding elongated cross-sectional configurations, provide a comparatively fixed axis of pivotal rotation for the treadle 20 in a manner preventing lateral movement of the free end of the treadle for a purpose to be hereinafter discussed. The tongue further prevents disengagement of the pivoted parts while the treadle is in an operative position by being bent at 31 beyond the opening 27 in a direction away from the treadle 20 so as to provide a locking relation between the bent portion 32 and the bottom face of the toe board 28.

Adjacent the upper end and on the lower face thereof, the treadle 20 is provided with a rubber lug 33 having a socket 34 therein with a restricted mouth 35 engaging a knob 36 located on the upper extremity of an accelerator or control arm 37 conventionally urged to a raised or retarded position by a spring (not shown) and extending through the opening 38 provided therefor in the toe board 28 and spaced from the former opening 27 a distance equal to the radius of the arc 39 traveled by the lug 33 when the treadle is depressed. The other end (not shown) of the accelerator arm 37 may be so supported that regardless of the position the treadle 20 is operatively disposed in at any given time the arm 37 will pass through the center of the opening 38 in a manner whereby the size of the opening 38 may be reduced to a minimum to reduce drafts coming therethrough.

Installation or removal of the pedal is very readily accomplished by the tongue 24 being either introduced to or removed from the opening 27, as the case may be, when the treadle 20 is in an approximately vertical position manually imposed thereupon either before or after the lug 33 is brought into an engagement with the knob 36 in the socket 34.

It is apparent from the description thus far that a new and useful pedal is provided pivotally cushioned in rubber against rattles, squeaks and drafts, and, though locked against pivotal dissociation when in an operative position, yet is very easily installed or removed by a single manual movement made in the respective directions naturally followed in doing so. Further it is to be seen that the pedal is of an integral construction which eliminates assembled parts conventionally used heretofore in the art to support pedals, and also eliminates dimensional variations and adjustments encountered in manufacturing and using such conventional parts. The mounting of the present invention is one of a direct and determined pivotal engagement with the toe board without use of further parts and provides a snap relation between the treadle and the accelerator arm easily and readily engaged or disengaged.

It is also apparent from the description thus far that an accelerator construction is provided for automobiles which has an increased ease and safety of operation since lateral movement of the treadle is eliminated as heretofore described and the arm 37 is supported so that it passes at all times through the center of the opening 38 in a manner whereby rubbing or sticking of the arm against the sides of the opening and the dangers of highway accidents incident thereto are eliminated. Further, it is to be noted that this increased freedom of movement of the arm 37 also safely permits a substantial reduction of the retarding tension conventionally predisposed on automobile accelerators, to the end that driving effort and the accompanying fatigue encountered thereby over long periods of driving may be eliminated.

Referring to Figs. 3 and 4, a modification is shown wherein the rubber coating 22 is continued beyond the lower end of the core 21 and is reversely bent to provide a pivotal axis of rotation 40 at the bend and a flange 41 having keyhole slots 42 therein adapted to engage in a supported relation with the circumferential grooves 43 in the spaced pins 44 secured to the toe board 28. This embodiment is readily installed and removed from an automobile by the relative and apparent sliding relation existing between the grooved pins 44 and the keyhole slots 42, the latter being so directed that the narrow portions 45 thereof are urged to engage in the grooves 43 against dissociation under the natural downward weight of the treadle 20 on the inclined toe board 28, and by the constraining influence of the accelerator arm 37 when the lug 33 engages knob 36.

Figs. 5 and 6 show another modification of the invention. Parallel slots 46 lying in vertical planes are provided in the inclined toe board 28. Resiliently intersecting the bore of the slots 46 adjacent their upper ends, is a spring wire 47 permanently mounted on the toe board 28 against the lower face thereof as by a struck out portion 48 of the toe board curled about the central portion 49 of the wire. A bracket 50, permanently and pivotally associated with the treadle as by nested parts 51 and 52 spaced relative to each other and pivotally supported in comparatively soft and yielding rubber 53, is shown with downwardly projecting parallel flanges 54 insertable in the slots 46. These flanges have a narrow intermediate neck portion 55 and a wider wedge-shaped head portion 56 providing shoulders 57 and 58 on the sides thereof facing the bracket. The shoulder 57 on the upper side of the flange 54 is spaced from the bracket 50 a distance equal approximately to the combined thickness of the wire 47 and the toe board 28 while the distance of the shoulder 58 from the bracket is only that of the thickness of the toe board 28. The flanges 54 are held in their inserted relation relative to the slots 46 by the shoulder 57 receiving the wire 47 thereagainst and the shoulder 58 contacting the lower face of the toe board 28 with the adjacent neck portion 55 pressed against the lower end of the slots 46 under the urge of the spring 47 against the opposite edge of the neck 55, the shoulders 57 and 58 being located relatively for the correct positioning of the treadle 20 in the automobile.

Insertion of the flanges 54 into the slots 46 is accomplished by terminally depressing the spring wire 47 from its predisposed slot intersecting position through the agency of the wedge-shaped heads 56 until the flanges are inserted to their full extent, whereupon the spring 47 snaps into engagement with the neck portion 55 behind the shoulder 57 and moves the flanges 54 laterally in a direction longitudinal to the slots 46 until the opposite side of the neck contacts the lower ends of the slots and the shoulders 58 engage the lower face of the toe board 28. Removal of the flanges may be accomplished readily by the contour of the shoulders 57 being so formed as to displace the spring 47 therefrom when a strong upward pull is exerted upon the bracket 50.

Another modification of the invention is shown in Figs. 7 and 8 wherein the rubber sheath 25, shown in Fig. 1 is omitted and the flange 59 is reduced in width to provide shoulders 60 and a tongue 61 engaging in an opening 62 in a manner so that the shoulders 60 pivotally rest upon the marginal edges of the opening 62 to provide a practically frictionless knife edge bearing between the treadle 20 and the toe board 28. The opening 62 may be provided either in the toe board 28 or in a bracket 63 suitably secured to the toe board. The bracket is particularly desirable where the toe board is covered with an extra or thick covering member 64, or where it is not deemed desirable or convenient to provide an opening in the toe board itself.

In this particular embodiment the bracket 63 is furnished and comprises a U-shaped central portion 65 having supporting sides 66 terminating in flanges 67 co-planar with and adapted for a face to face contact with the surfaces of the toe board 28 and floor board 68 to which they may be secured as by welding. If the opening 62 is provided directly in the toe board 28, an antidraft pad (not shown) may be molded or secured to the flange 59 adjacent the shoulders 60 in a manner sealing the interstices between the moving parts. But where the bracket is used and particularly where the metal of the bracket is comparatively soft, a washer 69 may be interposed between the shoulders 60 and the bracket 63 to eliminate rattles and increase the wearing qualities of the pivoted parts.

In Figs. 9 and 10, the toe board 28 has secured thereto, as by a conventional nut 70 and bolt 71, a bracket 72 having an upstanding flange 73 terminating in a beaded edge 74 providing a cylindrical bearing surface 75. On this surface a rubber channel member 76 is rotatably mounted with a restricted opening 77 preventing radial disengagement of the parts. Bonded to and substantially encompassing the rubber member is a metal U-shaped channel member 78 having converging sides 79 rigidly supporting those walls of the rubber member 76 which define the restricted opening 77. The metal member 78 is secured at its base transversely to the treadle 20, as by welding, and adjacent the lower end of the treadle. In this manner the treadle is pivotally mounted about a fixed axis and in rubber between the two rigid parts 72 and 78, the pivotal movement being accomplished between the inner face of the rubber member 76 and the cylindrical face 75 of the bead 74. The installation and removal of the treadle 20 in this embodiment is accomplished when the lug 33 is disengaged from the knob 36 by moving the rubber member 76 longitudinally along the beaded portion 74, and when installed, the treadle 20 is retained in operative position relative to the bracket 72 through the engagement between the knob 36 and the lug 33 due to the rigidity of the accelerator arm 37 supported in the opening 38 against lateral movement thereof.

An improved, new and useful operation, as afforded by the invention, is diagrammatically represented in Fig. 11. The toe board and floor board are indicated at 28 and 68 respectively. The pivotal mounting of the treadle 20 is shown at A and the point where the heel 80 of the driver's shoe 81 contacts the floor board 68 is indicated at B. The letter C indicates the approximate center of frictional contact between the sole 83 of the shoe 81 and the face of the treadle 20 when the treadle is in a retarded position, and it should be noted at this time that A is a substantial distance below the tread face of the treadle in accordance with the structures and embodiments heretofore described. As a result, the treadle 20, when depressed, not only moves pivotally about the point A, but moves bodily forward and upward away from the floor board 68. The point C on the treadle moves in the arc X to a new position D and the point C on the sole 83 moves in the arc Y about B to a new point E.

The substantial differential between the movements of the respective C's to points D and E when the pedal is depressed furnishes an index to the improved operation of the invention, and as a corollary it sould be recognized that if the point C is maintained identical for both the sole 83 and the treadle 20 throughout the movement of the latter, the point B would move along the floor board 68 in a manner establishing a similar differential in the plane of the floor board which would supply the same improved operation contemplated by the invention. This differential operates to substantially increase the distance between the point C on the treadle 20 and the point B on the floor board when the pedal is depressed, and then, due to the frictional contacts between the sole 83 and the treadle 20 and the heel 81 and the floor board 68, it will be readily appreciated that the shoe 81 wedged between the two points D and B, aided by its weight and the friction mentioned, would hold the treadle 20 automatically in a given depressed position until either the heel 80 or sole 83 of the driver's shoe 81 is moved. This wedging effect is an advantage of material aid in steadying the operation of the accelerator under driving conditions, particularly in the case where rough riding jostles the driver's foot and results in undesirable fluctuations in the acceleration of the automobile. Effort upon the driver's part obviously is lessened and the ease of driving especially on long trips is increased.

Although certain preferred embodiments of the present invention have been shown and described herein, it will be apparent to those skilled in the art that various uses, modifications and changes may be made therein without departing from the spirit and substance of the invention, the scope of which is commensurate with the appended claims.

What is claimed is:

1. A pedal for a motor vehicle having a toe board and an opening therein, including a treadle, means integral therewith for pivotally supporting said treadle directly on said toe board, means for engaging in said opening in a manner preventing dislodgment of said first means relative to the toe board, and means for operatively engaging said treadle to a control arm of the vehicle.

2. A pedal for a motor vehicle having a toe board and an opening therein, including a treadle, a flange integral therewith for supporting the treadle on the toe board to pivot on a substantially fixed axis, means in said opening in said board for maintaining said pivotal relation of said flange, and means for operatively engaging said pedal to a control arm of the vehicle.

3. A pedal for a motor vehicle having a toe board and an opening therein, including a treadle, means integral therewith for pivotally supporting said treadle relative to the toe board in the opening, a tongue secured to said means for engaging in the opening and cooperating to maintain said pivotal relation, and means for operatively engaging said treadle to a control arm of the vehicle.

4. A pedal for a motor vehicle having a toe board with an opening therethrough including a treadle, a depending supporting flange on said treadle and extending through the opening of the toe board, a rubber covering secured on said flange for pivotally cushioning the flange in the opening, and means for operatively engaging said treadle with a control arm of said automobile.

5. A pedal including a treadle member, a flange adjacent one end thereof for pivotally supporting said treadle at the marginal edges of an opening in a toe board of an automobile, a tongue on the flange extending through said opening for determining the pivotal relation, said tongue being bent beyond the opening in a direction remote from the treadle and in a manner preventing disengagement of the pivotal relation while said treadle member is in an operative position, and releasable means operatively engaging said treadle to a control arm of said automobile.

6. A pedal for an automobile including a treadle, a flange adjacent one end thereof for bridging an opening in a toe board of said automobile in a manner providing a pivotal support for said treadle, and releasable means for operatively engaging the treadle to a control arm of the automobile, said flange being provided with an integral tongue extending through said opening and so constructed and arranged as to prevent disengagement of the pivotal parts while the treadle is in an operative position.

7. A pedal for an automobile including a treadle, means integral therewith for pivotally supporting the treadle relative to a toe board of the automobile having an opening therein, means on said treadle for engaging in said opening to prevent disengagement of the pivoted parts while the treadle is in an operative position, and means for operatively connecting the treadle to a control arm of the automobile when the former is in said operative position.

8. A pedal for an automobile including a treadle, a reinforcing core member therefor terminating in a downwardly projecting flange, downwardly exposed shoulders on said flange for pivotally bridging an opening in a toe board of said automobile, means secured to said flange for engaging in said opening to maintain said pivotal engagement while the treadle is in an operative position, and means for operatively connecting said treadle with a control arm of said automobile.

9. A pedal for an automobile including a treadle member, means integral therewith for pivotally mounting said treadle in an opening in a toe board of said automobile, means in said opening for retaining said pivotal relation, means secured to the last said means for sealing the interstices between the opening and the last means to prevent drafts, and means for operatively connecting said treadle to a control arm of said automobile.

10. A pedal including a treadle, a downwardly extending flange integral therewith, a downwardly presenting shoulder on said flange providing a bearing surface for pivotally contacting the face of a toe board of an automobile, a terminally bent tongue secured to the flange for positioning said pivotal contact relative to an opening in said toe board provided for that purpose, and means operatively connecting the treadle to a control arm of the automobile.

11. In combination with a motor vehicle having a toe board with the end of a control arm disposed thereabove and an opening spaced from said arm, a treadle, flange means integral therewith engaging in said opening for pivotally supporting said treadle relative to said toe board and releasable means for operatively connecting said arm to the treadle.

12. In combination with a motor vehicle having a toe board with a control arm disposed thereabove and an opening spaced from said arm, a treadle, a depending flange integral with said treadle projecting into said opening, means on said flange pivotally engaging said toe board, and means on said treadle operatively connected to said arm.

13. In combination with a motor vehicle having a toe board with spaced openings therein through one of which a control arm extends, a treadle operatively engaging said arm, and means rigid with said treadle pivotally mounted in the other of said openings on a substantially fixed axis for supporting said treadle.

14. In combination with a motor vehicle having a toe board with a control arm proximate thereto and an opening therein spaced from said arm, a treadle operatively engaging said arm, and means rigid with said treadle extending through said opening and mounted therein in a manner pivotally supporting said treadle and confining pivotal movement thereof about a given axis.

15. In combination with a motor vehicle having a toe board and a control arm proximate thereto and an opening therein spaced from said arm, a treadle operatively engaging said arm, means rigid with said treadle pivotally supporting the latter at the toe board, means secured to said first means and extending through said opening for confining the pivotal movement of the parts about a given axis.

16. In a motor vehicle having a toe board with an opening therethrough, a pedal comprising a treadle plate and a leg depending from the treadle plate and projecting through the toe board opening, said leg pivoting against an edge of the toe board defining said opening.

17. In a motor vehicle, a fixed rigid member having an opening therethrough, a treadle plate having a depending leg, said leg projecting into said opening and pivoting in an unattached relation against the edge portion of the member defining the opening, and an arm associated to be actuated by said treadle plate during its pivotal movement.

FRANK C. BEST.